June 28, 1966 H. IMANUEL 3,258,620
HIGH SPEED ROTOR POLE ENCLOSURE
Filed Nov. 29, 1962
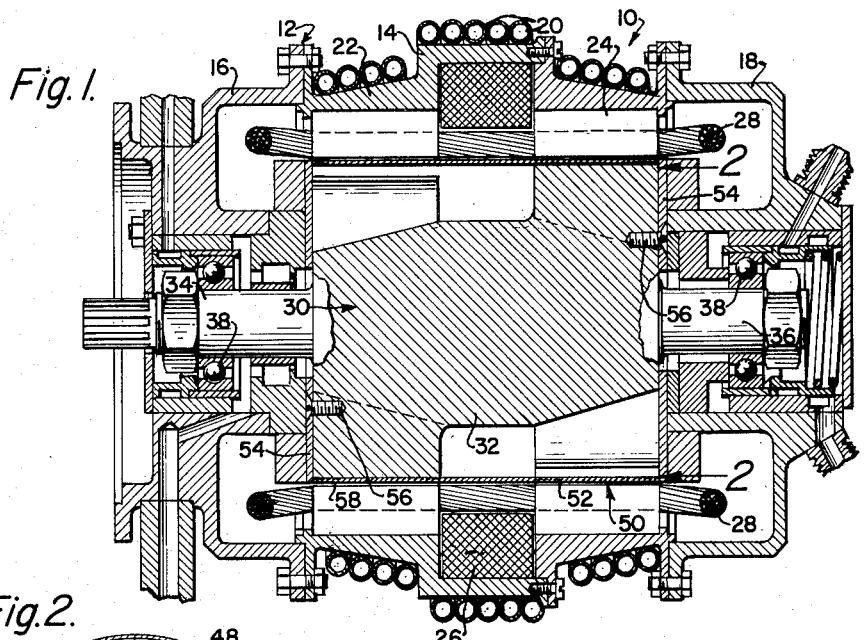
Fig. 1.
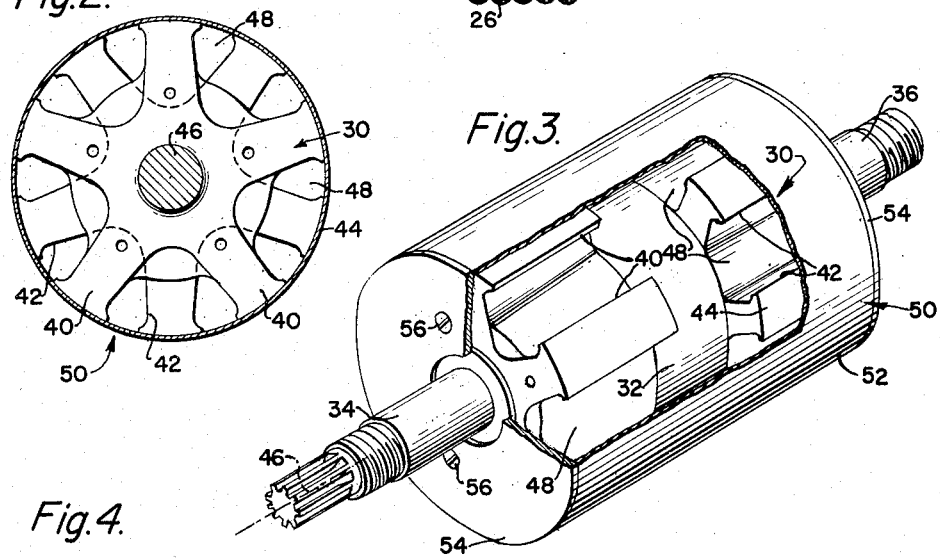
Fig. 2.
Fig. 3.
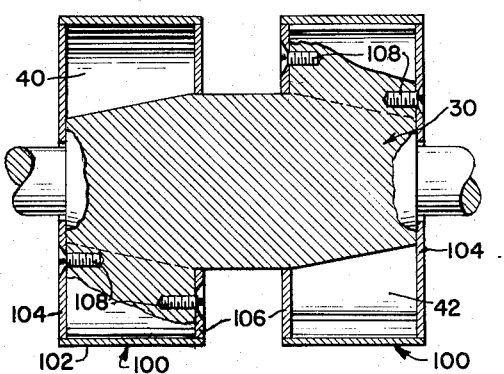
Fig. 4.
INVENTOR:
HARVEY IMANUEL,
BY:
Attorney.

3,258,620
HIGH SPEED ROTOR POLE ENCLOSURE
Harvey Imanuel, Long Beach, Calif., assignor to The Garrett Corporation, Los Angeles, Calif., a corporation of California
Filed Nov. 29, 1962, Ser. No. 240,834
2 Claims. (Cl. 310—86)

This invention relates generally to improvements in high speed rotary electrical machines and particularly to means for minimizing windage losses in machines of this kind.

Many present day electrical generators are designed for operation at extremely high rotor speeds. Rotor speeds in the order of 40,000 to 50,000 r.p.m., for example, are not uncommon. One reason for designing a generator to operate at such ultra-high speeds is to enable a gas turbine to be used as the prime mover for the generator without the necessity of reduction gearing between the turbine and the generator. A direct turbine drive of this type is highly desirable, of course, since it reduces the cost and complexity of the generating system, eliminates the power losses inherent in all rotary transmissions, substantially improves reliability, and minimizes upkeep and servicing.

A second reason for designing electrical generators to operate at ultra-high speeds is that the power output of a generator increases as its rotor speed increases. Accordingly, an ultra-high speed generator has a greater power output than a generator of equivalent size and weight operating at normal speed. Conversely, for a given output, an ultra-high speed generator is lighter and more compact than a conventional generator.

When rotating at speeds on the order of those mentioned, a generator rotor is obviously subjected to tremendous centrifugal force. For this reason, ultra-high speed generators are generally of the inductor type since the unitary or integral rotor construction of such a generator is capable of withstanding centrifugal force of the magnitude involved at ultra-high speeds.

Unfortunately, up to the present time, the advantages gained by generator operation at ultra-high speeds have been offset by the windage loss which normally occurs in an inductor type generator at these speeds. This windage loss occurs, of course, as a result of the high velocity movement of the radially projecting poles on the generator rotor through the air within the generator housing.

By way of illustrating the magnitude of windage losses in high speed generators, it can be stated that in some conventional alternators operating at speeds in the range of 15,000 r.p.m., the decrease in efficiency caused by windage drag on the rotor may be as high as 40%. Since windage loss increases exponentially with rotor speed, it is readily evident that windage loss at the ultra-high rotor speeds mentioned earlier presents a major problem.

Various methods of minimizing windage loss in generators have been proposed. The use of a hermetically sealed and evacuated rotor enclosure has been suggested, for example. This solution, however, involves the difficult problem of preventing air leakage into the enclosure and/or the use of costly, complex, and bulky vacuum equipment to initially evacuate the enclosure and, in some cases, to thereafter maintain the enclosure properly evacuated. Cooling of the generator is also frequently a serious problem when the rotor is hermetically sealed in an enclosure.

Another suggested solution to the problem of reducing windage loss has been the use of a hermetically sealed rotor enclosure containing a low density gas, such as helium, under light pressure. This solution obviously presents essentially the same difficulties as the evacuation method first discussed.

The above difficulties are avoided in a further proposed solution to the problem of windage loss, according to which the interpolar spaces of the rotor are filled with a suitable non-magnetically permeable material. The use of such interpole fillers, however, results in an undesirable increase in the rotor mass and seriously complicates fabrication of the rotor. For example, if the fillers are welded in place, the welds are difficult to make and constitute a source of weakness and unreliability. Further, the uneven heat distribution existing in the rotor during welding results in distortion of and creation of localized stress concentrations in the rotor.

The fundamental aim of the present invention is to provide a simple, highly efficient, and economical solution to the problem of reducing windage loss in rotating electrical machinery. Since windage loss is most acute in ultra-high speed electrical machines which are usually electrical generators, and since such ultra-high speed generators are most frequently of the inductor type, the preceding discussion has been directed primarily toward, and the invention is hereinafter disclosed in relation to its use on, such ultra-high speed inductor generators. It will be readily evident as the description proceeds, however, that the present invention may be used to advantage on any kind of rotary electrical machine, including both motors and generators, in which windage loss is a problem.

It is, accordingly, a general object of this invention to provide a new and improved means for minimizing windage loss in rotary electrical machines, especially ultra-high speed machines, such as ultra-high speed inductor generators.

Another object of the invention is to provide a means for minimizing windage loss which is simple in construction, economical to manufacture, easy to install, and otherwise ideally suited to their intended purposes.

Other objects, advantages, and features of the invention will become readily evident to those skilled in the art as the description proceeds.

According to the present invention, the windage loss in a rotary electrical machine having a rotor with interpole spaces or other windage-loss-inducing irregularities is minimized by enclosing or jacketing the rotor in a smooth-surfaced sleeve or cylinder. This sleeve preferably has a light interference fit on the rotor just sufficient to effect accurate coaxial alignment of the sleeve and rotor. The sleeve covers the circumferential or peripheral gaps or other irregularities in the rotor periphery and provides the rotor, in effect, with a smooth external cylindrical surface which reduces air drag on the rotor to an absolute minimum.

In the case of those rotors which also have axially opening gaps or other axial irregularities, such as the rotor of an inductor generator, the drag-reducing sleeve is provided with end plates for covering such axial irregularities. These end plates may be bolted or otherwise attached to the rotor and may serve to axially position the sleeve on the rotor.

According to the preferred practice of the invention, the present rotor jacket, including both the sleeve and end plates, is fabricated of titanium when intended for ultra-high speed operation in the speed range mentioned earlier. Titanium is preferred since it is capable of satisfying the several essential requirements of an ultra-high speed rotor jacket, to wit, non-magnetic, high tensile strength, ability to withstand elevated temperatures, low coefficient of thermal expansion and others.

A unique feature of the invention resides in the fact that the rotor jacket is designed to "grow," that is expand radially with the rotor under the action of centrifugal force. The rotor growth, therefore, does not impose undue stress on the jacket.

A better understanding of the invention may be had from the following detailed description of the invention taken in connection with the attached drawings wherein:

FIG. 1 is a longitudinal section through an inductor type generator whose rotor is jacketed according to the invention;

FIG. 2 is a section taken on line 2—2 of FIG. 1;

FIG. 3 is an enlarged perspective view, partially broken away, of the rotor in the generator of FIG. 1; and FIG. 4 illustrates an alternative way of jacketing the rotor of the generator in FIG. 1.

In these drawings, numeral 10 denotes a conventional inductor generator comprising a housing 12 including a generally cylindrical body 14 and end bells 16 and 18 bolted to the ends of the body. Wrapped about the outside of body 14 is a tube 20 through which a coolant is adapted to be circulated for cooling the machine. Within the generator housing 12 are two laminated, axially spaced, stators 22 and 24 which are generally annular in a section normal to the generator axis.

Between the stators 22 and 24 is the field winding 26 of the generator. This winding is energized from a suitable external power source through supply terminals (not shown) on the generator housing. The stator also has a multipole, polyphase winding 28 which links the two stators 22 and 24. This winding connects to power take off terminals (not shown) on the generator housing.

Within the generator housing is the generator rotor 30. Rotor 30 has the configuration of a conventional homopolar generator rotor and comprises a main body 32 which is located within the stators 22, 24 and end shafts 34 and 36 which are rotatably supported in the end bells 16 and 18, respectively, by ball bearings 38. One end shaft of the rotor 30 is exposed through an axial opening in the respective end bell and splined, as illustrated, for driving connection to a prime mover, such as a gas turbine.

The rotor body 32 has generally radially directed, circumferentially spaced poles 40 and 42 at its ends, respectively. Poles 40 and 42 are angularly displaced by one half the included angle between adjacent poles. The tip surfaces 44 of the rotor poles are cylindrically curved about the rotor axis 46 and have the same radius of curvature.

The generator thus far described is a conventional inductor generator and operates, in the well known way, to generate a polyphase voltage in the stator winding 28 when the rotor is driven with the field coil 26 energized.

As mentioned earlier, generators of this kind are often designed for operating speeds in the range of 40,000 to 50,000 r.p.m. to provide a compact, high power generator and/or to enable a direct drive of the generator from a gas turbine or other ultra-high speed prime mover.

At these operating speeds, the wind friction drag on the generator rotor 30, and, therefore, the windage loss in the generator, are large because of the drag-inducing spaces 48 which exist between the rotor poles 40 and 42. According to the present invention, the wind friction drag on the rotor, and, thereby, the windage loss in the generator, are reduced to an absolute minimum by enclosing the rotor in a jacket 50 which covers both the radially opening sides of the interpole spaces 48 and the axially opening sides of these spaces.

Referring to FIGS. 1, 2 and 3 the rotor jacket 50 illustrated comprises a thin-walled cylinder or sleeve 52 through which the rotor body 32 is inserted and annular end plates 54 which fit about the rotor shafts 34 and 36, respectively, and against the end surfaces of the rotor body 32. End plates 54 are preferably attached to the rotor body by screws 56 recessed flush with the end plates. In the drawings the end plates 54 have been shown as having an external diameter equal to that of the jacket sleeve 52 and as seating against the ends of the sleeve. The end plates therefore would inherently axially locate the sleeve if the latter were not attached to the end plates. It is possible that in some applications, the sleeve 52 need not be physically attached to the end plates 54 but merely axially located by the latter. For ultra-high speed applications, however, the end plates are preferably welded to the sleeve.

According to one method of fabrication and assembly of the rotor jacket 50, the sleeve 52 is made from a metal strip whose edges are butt welded to form a sleeve. Before assembly on the rotor, one end plate 54 is welded to the sleeve. The sleeve and attached end plate are then placed in assembled position on the rotor and fastened to the same by screws 56. The second end plate is then placed in position on the rotor, fastened to the latter by screws 56, and welded to the sleeve 52 to complete the jacket 50.

At the ultra-high speeds contemplated by the invention, the jacket 50 is subjected to stresses of large magnitude as a result of centrifugal force. Also, the jacket is subjected to elevated temperatures which may be in the range of 600° F. to 700° F., for example, or even more. On the other hand, the annular gap 58 between the rotor 32 and stators 40, 42 is narrow so that the jacket sleeve 52 must be quite thin. The thickness of the sleeve, for example, may be required to be on the order of .022 to .027 inch. Also, the jacket is preferably light weight so as to not materially increase the mass of the rotor 30 and must, of course, be non-magnetically permeable.

These several jacket requirements are ideally satisfied when the jacket, including both its sleeve 52 and end plates 54, are fabricated from titanium or titanium base alloys. It is obvious, however, that other materials may be suitable in some cases so that the invention should not be regarded as limited to the use of a titanium or titanium base jacket.

According to the preferred practice of the invention, the jacket sleeve 52 has a light interference fit (0.030–0.050 inch) on the rotor 32, just sufficient to positively coaxially position or align the sleeve with respect to the rotor. It has been found that when the sleeve is provided with such a light interference fit on the rotor, the jacket 50 "grows," i.e., expands radially under the action of centrifugal force, with the rotor 30 during ultra-high speed operation of the generator. The growth of the rotor, therefore, does not create excessive stress in the jacket.

FIG. 4 illustrates an alternative method of jacketing the rotor 30 of the homopolar generator 10 in FIG. 1. In this case, the rotor poles 40 and 42 are enclosed by separate jackets 100. Each jacket 100 comprises a sleeve 102 which fits about the respective poles and end plates 104 and 106 welded to opposite ends of the sleeve 100 and seating against opposite sides of the respective poles. End plates 104 are attached to the rotor by screws 108, as before. End plates 106 are each split along a diameter into two complementary halves to permit the latter plates to be placed about the rotor body. In FIG. 4, the jacket sleeves 102 have been shown as fitting about the edges of their respective end plates.

When installing the jackets 100, end plates 104 are welded to their respective sleeves 102 after which the latter are placed on the rotor. The split end plates 106 are then placed in position and welded to the respective jacket sleeves 102.

It will be immediately evident to those skilled in the art that the present invention is not limited in application to homopolar generators designed for ultra-high speed operation. The rotors of most rotary electrical machines, both motors and generators, for example, may be jacketed according to the invention to reduce windage loss. It is also evident that in those cases where the drag-inducing irregularities in a rotor are limited to the periphery of the rotor, it may be necessary to jacket the rotor in a sleeve only, thereby eliminating the end plates of the jackets shown in the drawings.

Clearly, therefore, the invention herein described and illustrated is fully capable of attaining the objects and advantages preliminarily set forth.

While certain presently preferred embodiments of the invention have been disclosed, various modifications of the invention are possible within its spirit and scope.

I claim:

1. In an inductor type generator including stator means and a rotor rotatably mounted in said stator and having a pair of axially spaced sets of radially directed, circumferentially spaced poles, the improvements comprising:

a separate sleeve coaxially positioned about each of said sets of rotor poles in contact therewith; and end plates secured at the ends of the poles of each of said sets of poles, the peripheries of said plates being disposed closely adjacent the ends of the respective sleeves, both said sleeves and said end plates being characterized by being formed of high tensile strength material having low magnetic permeability.

2. The subject matter of claim 1 wherein:

said material forming the sleeves and end plates is titanium or titanium base alloy.

References Cited by the Examiner

UNITED STATES PATENTS

| | | | |
|---|---|---|---|
| 2,985,779 | 5/1961 | Flanigam | 310—156 |
| 3,053,189 | 9/1962 | White | 310—86 X |
| 3,082,338 | 3/1963 | Turk | 310—261 |
| 3,113,227 | 12/1963 | Bomberger et al. | 310—55 |
| 3,157,806 | 11/1964 | Wiedemann | 30—64 |
| 3,165,655 | 1/1965 | Eis | 310—54 |

MILTON O. HIRSHFIELD, *Primary Examiner.*

D. F. DUGGAN, *Assistant Examiner.*